United States Patent
Thomas

[19]

[11] Patent Number: 5,924,403
[45] Date of Patent: Jul. 20, 1999

[54] METHOD FOR ENHANCED SPLIT INJECTION IN INTERNAL COMBUSTION ENGINES

[75] Inventor: Eric D. Thomas, Canton, Mich.

[73] Assignee: Detroit Diesel Corporation, Detroit, Mich.

[21] Appl. No.: 08/870,781

[22] Filed: Jun. 6, 1997

Related U.S. Application Data

[51] Int. Cl.$^6$ .................................................. F02M 37/04
[52] U.S. Cl. ........................................ 123/300; 123/436
[58] Field of Search .................................. 123/299, 300, 123/436, 419, 456, 446

[56] References Cited

U.S. PATENT DOCUMENTS

| | | | |
|---|---|---|---|
| 5,131,371 | 7/1992 | Wahl | 123/300 |
| 5,165,579 | 11/1992 | Cheng | 123/436 |
| 5,231,962 | 8/1993 | Osuka | 123/299 |
| 5,313,924 | 5/1994 | Regueiro | 123/300 |
| 5,402,760 | 4/1995 | Takeuchi | 123/300 |
| 5,445,128 | 8/1995 | Letang | 123/436 |
| 5,477,827 | 12/1995 | Weismann | 123/436 |
| 5,483,927 | 1/1996 | Letang | 123/322 |
| 5,647,317 | 7/1997 | Weismann, II | 123/300 |
| 5,771,865 | 6/1998 | Ishida | 123/436 |

*Primary Examiner*—Carl S. Miller
*Attorney, Agent, or Firm*—Brooks & Kushman P.C.

[57] ABSTRACT

A method for controlling a compression-ignition internal combustion engine which provides delivery of multiple fuel injection pulses per cylinder firing with precision of pulse quantities, separation, and timing adequate for transition between split and single injection at any speed and load, without disturbing the primary engine governor. The method compensates for variable operating conditions such as supply voltage, injection pressure, injection pulse separation, and injector actuation latency or rise-time.

18 Claims, 7 Drawing Sheets

METHOD FOR ENHANCED SPLIT INJECTION IN INTERNAL COMBUSTION ENGINES

TECHNICAL FIELD

The present invention relates to a method for controlling a compression-ignition internal combustion engine.

BACKGROUND ART

In the control of fuel injection systems, the conventional practice utilizes electronic control units having volatile and non-volatile memory, input and output driver circuitry, and a processor capable of executing a stored instruction set, to control the various functions of the engine and its associated systems. A particular electronic control unit communicates with numerous sensors, actuators, and other electronic control units necessary to control various functions, which may include various aspects of fuel delivery, transmission control, or many others.

Fuel injectors utilizing electronic control valves for controlling fuel injection have become widespread. This is due to the precise control over the injection event provided by electronic control valves. In operation, the electronic control unit determines an energizing or excitation time for the control valve corresponding to current engine conditions. The excitation of the control valve causes a cascade of hydraulic events leading to the lifting of the spray tip needle, which causes fuel injection to occur.

several attempts have been made to enhance fuel injection capabilities. One such method is known as split injection. Split injection consists of a first injection, called the pilot injection, followed by a delay, and then a second injection, referred to as the main injection. When performing split injection, precise control over pulse quantities, timing, and separation is essential. Many times, operating conditions at which split injection may be performed are restricted to lower engine speeds due to difficulties in achieving precise control over the injection process.

SUMMARY OF THE INVENTION

It is therefore an object of the present invention to provide a system and method for enhanced split injection which allows for smooth transition between split injection and single injection at any engine speed and load, without disturbing the primary engine governor.

It is an object of the present invention to provide an improved system and method for controlling fuel delivery in a fuel injector having an electronic control valve.

It is another object of the present invention to provide a system and method for accurately determining control valve rise-time.

It is another object of the present invention to provide a system and method for improved pulse width determination.

It is another object of the present invention to eliminate systematic influences which would otherwise detract from fuel delivery accuracy.

In carrying out the above objects and other objects and features of the present invention, a system and method for controlling fuel delivery in a fuel injector having an electronic control valve is provided. The method comprises establishing pilot and main injection rise-times for the control valve. Pilot excitation time is determined based on the pilot injection rise-time and a pilot fuel quantity. A desired inter-pulse gap between a pilot injection termination and a main injection actuation is determined. The desired inter-pulse gap is preferably based on engine RPM and varies so as to permit split injection at a wide range of engine speeds and loads. Main excitation time is determined based on the interpulse gap, main injection rise-time, and a main fuel quantity.

In a preferred embodiment, the method comprises the step of measuring available battery voltage. The main injection rise-time is further based on the inter-pulse gap and the available battery voltage.

The advantages accruing to the present invention are numerous. For example, the method of the present invention provides delivery of multiple fuel injection pulses per cylinder firing with precision of pulse quantities, separation, and timing adequate for transition between split and single injection at any speed and load, without disturbing the primary engine governor. The method compensates for variable operating conditions such as supply voltage, injection pressure, injection pulse separation, and injector actuation latency or rise-time.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
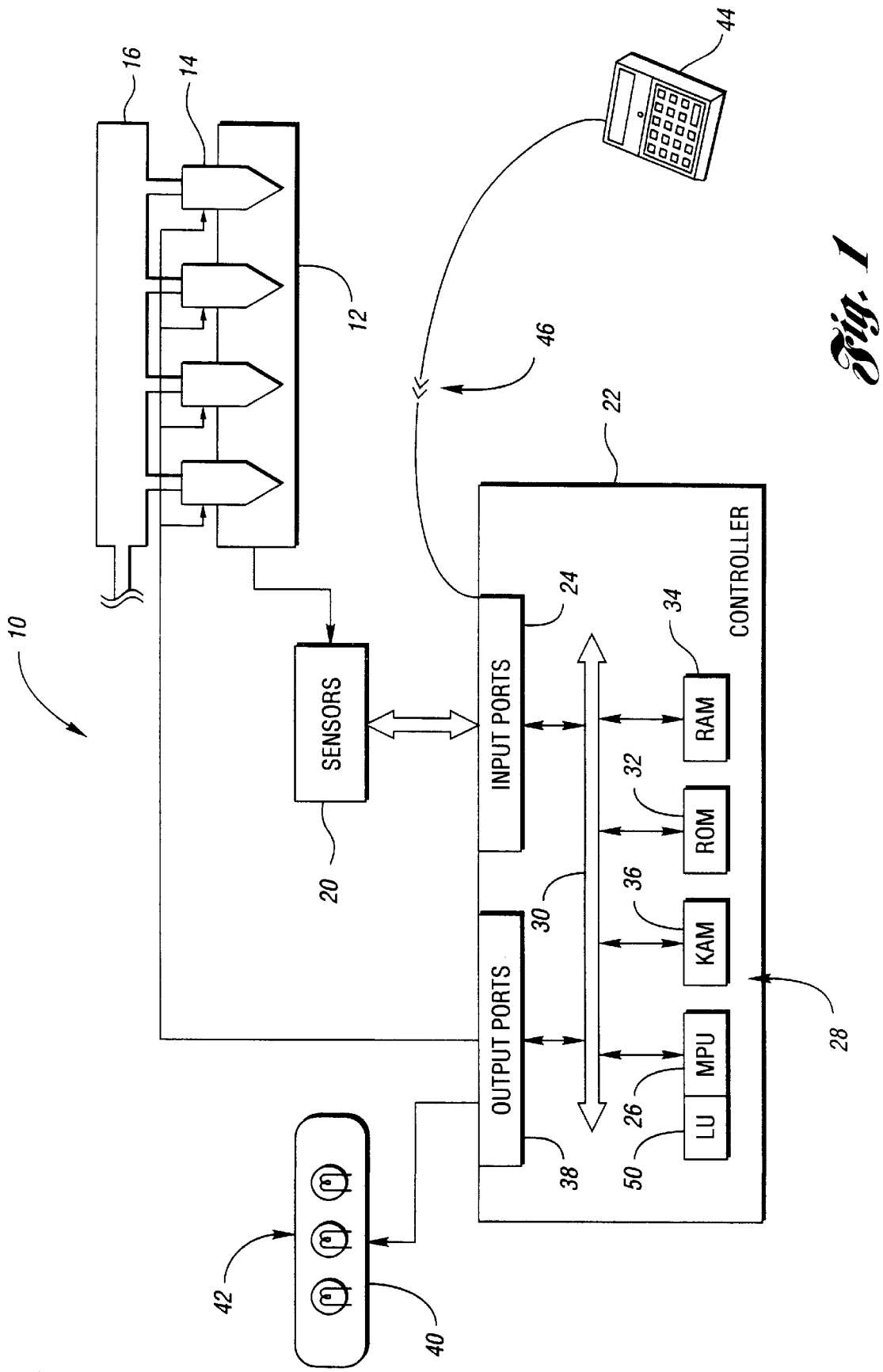
FIG. 1 is a schematic diagram of a fuel injection system made in accordance with the present invention.

Referring now to FIG. 1, a system for enhanced split injection in internal combustion engines is shown. The system, generally indicated by reference numeral 10, includes an engine 12 having a plurality of cylinders, each fed by fuel injectors 14. In a preferred embodiment, engine 12 is a compression-ignition internal combustion engine, such as a four, six, eight, twelve, sixteen or twenty-four-cylinder diesel engine, or a diesel engine having any other desired number of cylinders. The fuel injectors 14 are shown receiving pressurized fuel from a supply 16 which is connected to one or more high or low pressure pumps (not shown) as is well known in the art. Alternatively, embodiments of the present invention may employ a plurality of unit pumps (not shown), each pump supplying fuel to one of the injectors 14.

The system 10 may also include various sensors 20 for generating signals indicative of corresponding operational conditions or parameters of engine 12, the vehicle transmission (not shown), and other vehicular components. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as a read-only memory (ROM) 32, random access memory (RAM) 34, keep-alive memory (KAM) 36, and the like. The computer readable storage media may be implemented by any of a number of known physical devices capable of storing data representing instructions executable via a computer such as controller 22. Known devices may include, but are not limited to, PROM, EPROM, EEPROM, flash memory, and the like in addition to magnetic, optical, and combination media capable of temporary or permanent data storage.

Computer readable storage media 28 include various program instructions, software, and control logic to effect control of various systems and subsystems of the vehicle, such as engine 12, vehicle transmission, and the like. Controller 22 receives signals from sensors 20 via input ports 24 and generates output signals which may be provided to various actuators and/or components via output ports 38. Signals may also be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information therebetween. Interface 44 may be used to change values within the computer readable storage media 28, such as configuration settings, calibration variables including adjustment factor look-up tables, control logic, and the like.

In operation, controller 22 receives signals from sensors 20 and executes control logic embedded in hardware and/or software to allow smooth transitions between split injection and single injection at a wide range of engine speeds and loads, without disturbing the primary engine governor. In a preferred embodiment, controller 22 is the DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety. Additional features of the controller are described in detail in U.S. Pat. No. 5,839,420 Issued on Nov. 24, 1998, entitled "System and Method of Compensating for Injector Variability" the disclosure of which is hereby incorporated by reference in its entirety.

With continuing reference to FIG. 1, a logic controller, such as logic unit 50, controls the signals sent to the fuel injectors 14. Logic unit 50 determines rise-time adjustment factors, pulse width adjustment factors, pilot valve actuation detection delay adjustment factors, injection delay adjustment factors, and other injection parameters. The adjustment factors and injection parameters are determined from various engine operating conditions including but not limited to engine RPM, desired engine torque, available battery voltage, desired pilot to main inter-pulse gap, fuel temperature, measured fuel rail pressure (in common rail systems), and desired fuel rail pressure (in common rail systems).

Further, logic unit 50 determines the type of injection required: split or single, both of which may be smoothly switched between in accordance with systems and methods of the present invention, as will be described. Logic unit 50 may be included in the functions of microprocessor 26, or may be implemented in any other manner known in the art of hardware and software control systems. It will be appreciated that logic unit 50 may be a part of controller 22, or may be an independent control unit which is in communication with controller 22.

As will be appreciated by one of ordinary skill in the art, the control logic may be implemented or effected in hardware, software, or a combination of hardware and software. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

Figure 2:
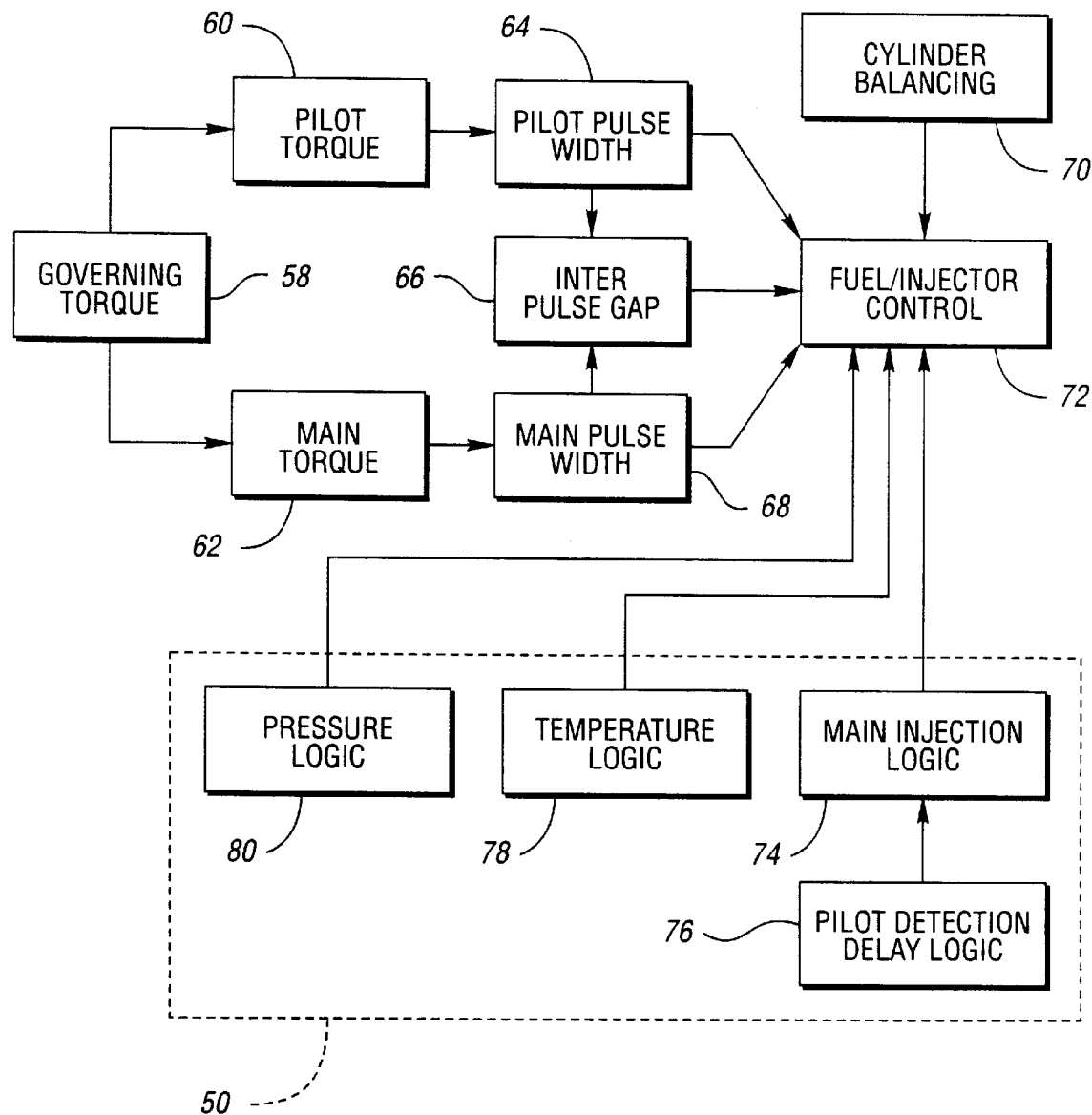
FIG. 2 is a functional block diagram illustrating fuel delivery control in accordance with the present invention.

Referring to FIG. 2, a functional block diagram illustrating enhanced split injection control is illustrated. Split injection, which is the delivering of fuel in two discrete quantities can reduce noise by reducing or eliminating ignition delay. A desired Engine Governing Torque 58 is determined based on various operating conditions such as engine RPM, throttle position, and transmission gear ratio. Alternatively, fuel per cycle or percent load could be used for the purposes of system control instead of Engine Governing Torque 58. Local Torque or Final Torque 58 is divided into a Pilot Torque (PTQ) 60 and a Main Torque (MTQ) 62. The value of PTQ 60 is the lesser of the Engine Governing Torque 58 and a Pilot Torque Limiting Value (EPIPTQ), not shown. The value of MTQ 62 is simply PTQ 60 subtracted from the Engine Governing Torque 58. If split injection is disabled, then PTQ 60 equals Engine Governing Torque 58, and MTQ 62 equals zero. In one embodiment, PTQ 60 is based on engine RPM, while MTQ 62 and Final Torque 58 are based on engine RPM and desired torque, leaving MTQ 62 equal to PTQ 60 subtracted from Engine Governing Torque 58. PTQ 60, MTQ 62, and Final Torque 58 are preferably located in look-up tables.

The quantity of fuel to be delivered is represented by the amount of angular displacement of the crankshaft, preferably measured in degrees, during which a control solenoid of an appropriate injector 14 (FIG. 1) is energized. This signal is referred to as the fuel pulse width. Alternatively, fuel quantity may be represented by a duration of pulse indexed by injection pressure. Two such Pulse Width values are determined, subject to further adjustment by other functions such as Cylinder Balancing 70 and/or other calibration techniques including injector variability compensation based on injector calibration codes. The values of the pulse widths are found in a look-up table referenced by engine operating parameters, such as engine RPM and desired torque. In a preferred embodiment, the desired torque used for this look-up function will be either Engine Governing Torque 58 or MTQ 62, and PTQ 60 such that two values are obtained.

A Pilot Pulse Width (PPW) 64 corresponds to the value of PTQ 60, while a Main Pulse Width (MPW) 68 corresponds to the value of MTQ 62 or Engine Governing Torque 58 depending on the system implementation. PPW 64 and MPW 68 may be subsequently subjected to further pulse width adjustment such as SPLIT_MAIN_PW_CORR, in accordance with the present invention.

Fuel injector control 72 initiates and terminates the pilot and main injections, and communicates with logic unit 50 to control fuel injection. The main injection logic 74, pilot detection delay logic 76, temperature influence adjustment logic 78, and pressure influence adjustment logic 80 may be applied to PPW 64 and MPW 68. Further, logic unit 50 cooperates with fuel injector control 72 to precisely control fuel injection timing, as will now be described in detail.

Figure 3:
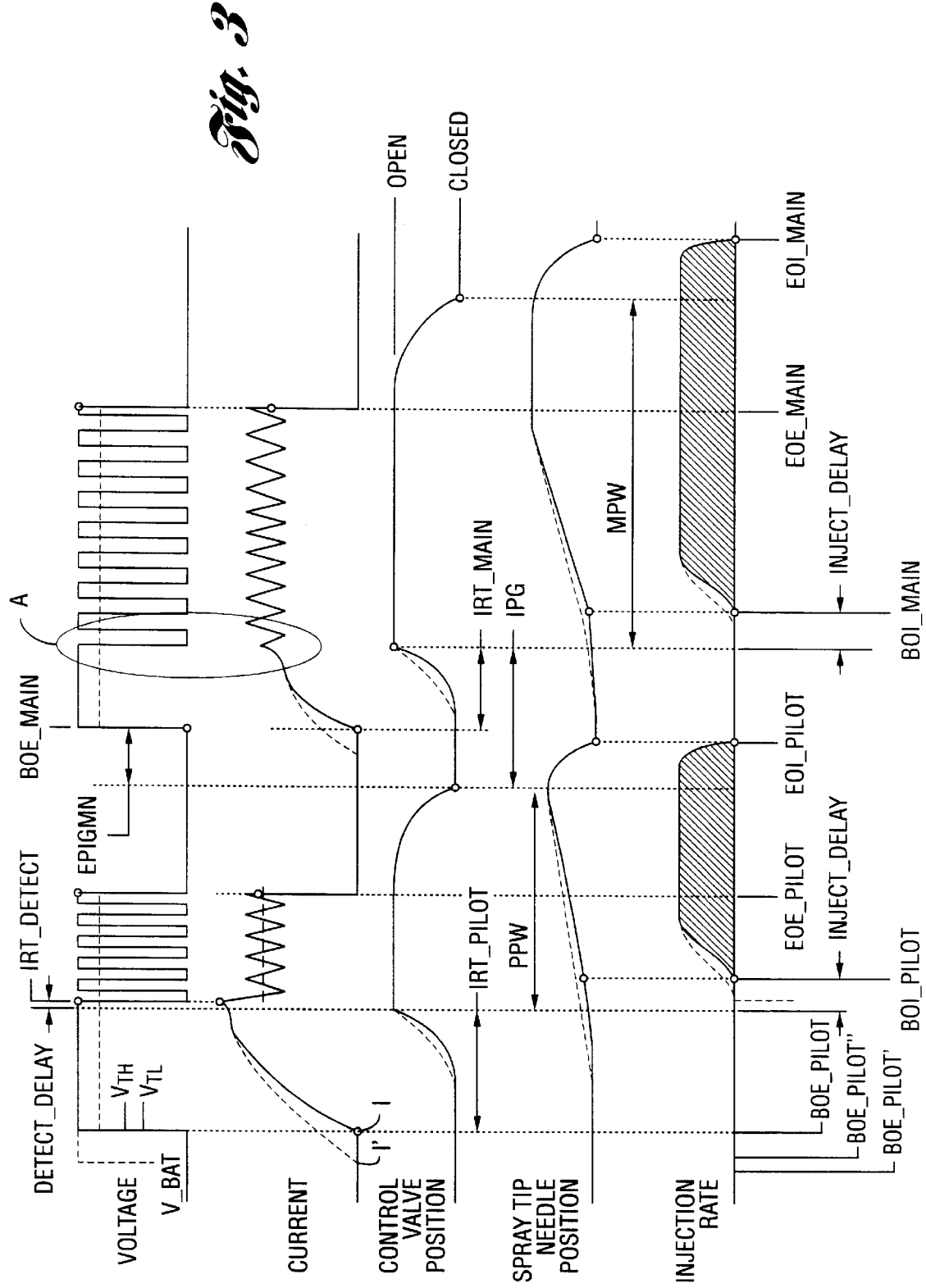
FIG. 3 is a timing diagram illustrating fuel delivery control in accordance with the present invention.
Figure 4:
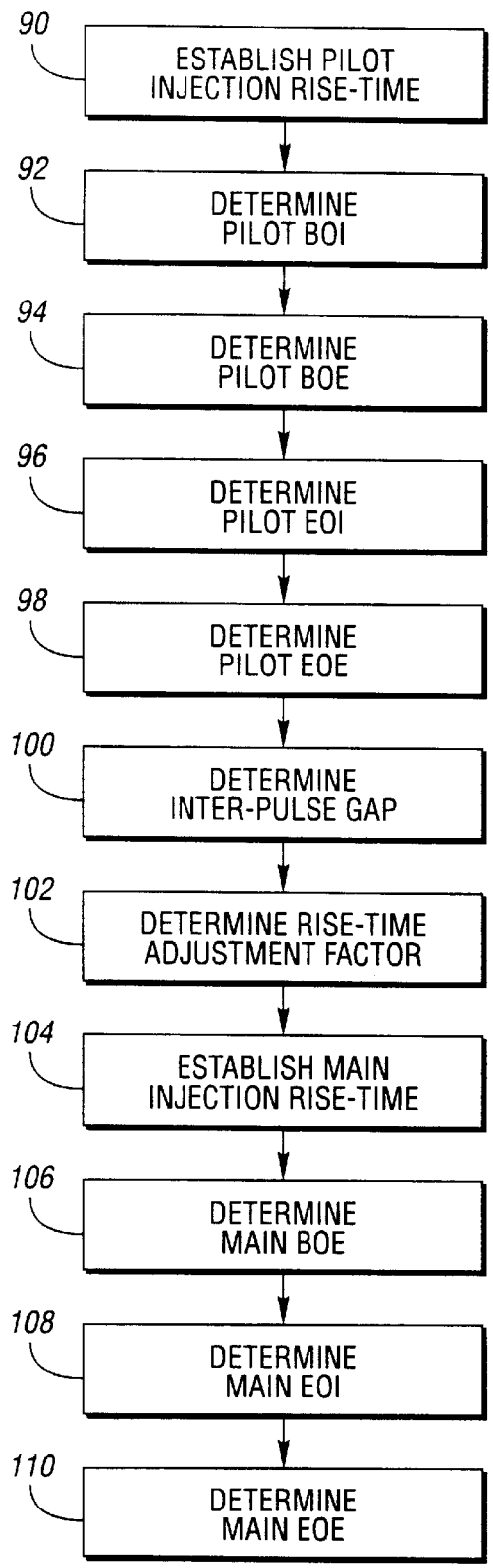
FIG. 4 is a block diagram illustrating a method of the present invention for controlling fuel delivery.

Referring now to FIGS. 3 and 4, a fuel injection timing diagram including actuation voltage, solenoid current, control valve position, spray tip needle position and injection rate, and a method for controlling fuel delivery are illustrated. When voltage is applied to the solenoid at the beginning of either the pilot or main pulse, the control valve response includes a rise-time or actuation latency defined as the time duration from voltage application to the control valve reaching the fully actuated position. It is to be appreciated that the present invention may be employed in both control valves in which the actuated position is the open position, and in control valves in which the actuated position is the closed position. Further, it is to be understood that the term available battery voltage herein means the voltage that is available to the particular engine component such as an injector solenoid, and that different components may have different voltage levels available for use.

At step 90, a pilot injection rise-time IRT_PILOT is established. This value may be established in a variety of different ways. In a preferred embodiment, a filtered injection rise-time is determined based on previous measured rise-times for the control valve during pilot injection. IRT_PILOT may also be established via a static look-up table, or may be measured in real-time if desired. Typical values for IRT_PILOT range from about 550 microseconds to about 4500 microseconds, and may be contained in a static look-up table populated by about 17 points, indexed by available battery voltage. At step 92, a pilot beginning of injection time BOI_PILOT is determined based on engine conditions such as engine RPM. When operating in split injection mode, BOI_PILOT (split mode) is offset from the BOI_PILOT (single mode) to provide adequate time for the pilot injection, interpulse gap, and main injections prior to piston top-dead-center to be completed at essentially the same piston position as with single injection.

At step 94, pilot beginning of excitation time BOE_PILOT is determined. BOE_PILOT precedes BOI_PILOT by at least the value of IRT_PILOT, as best shown in FIG. 3. At step 96, pilot end of injection time EOI_PILOT is determined based on BOI_PILOT and desired pilot pulse width PPW 64. PPW 64 is based on a desired pilot fuel quantity for pilot injection. At step 98, pilot end of excitation time EOE_PILOT is determined based on the required closing time of the control valve which is approximated as a constant.

At step 100, a desired inter-pulse gap IPG 66 is determined. The inter-pulse gap is the crankshaft angle or time interval beginning when the control valve reaches the fully unactuated position which terminates pilot injection, and ending when the control valve reaches fully actuated position at the onset of main injection. IPG 66 is a function of engine RPM and is preferably not less than IRT_PILOT. IPG 66 may also be based in part on engine torque. In preferred embodiments of the present invention, IPG 66 is subjected to a minimum time duration to allow split injection over a wide range of engine RPM. IPG 66 approaches a near constant crankshaft angle as engine RPM decreases, and approaches the minimum time duration as engine RPM increases. The varying of the inter-pulse gap as described immediately above allows split injection over an RPM range of, for example, 0 to about 2400 RPM while varying IPG 66 between about four and about sixteen degrees of crankshaft angle. In a preferred embodiment, IPG values populate a look-up table indexed by RPM and having about 17 points. It is to be appreciated that embodiments of the present invention allow split injection at near any engine speed including engine speeds of over 2000 RPM by selecting IRT_MAIN from a plurality of varying values based on engine conditions.

Main injection rise-time IRT_MAIN is determined based on IRT_PILOT, and is preferably adjusted based on inter-pulse gap. Further in a preferred embodiment, IRT_MAIN is adjusted based on measured available battery voltage V_BAT. Alternatively, IRT_MAIN may be established in any of the ways described for establishing IRT_PILOT.

Figure 7:
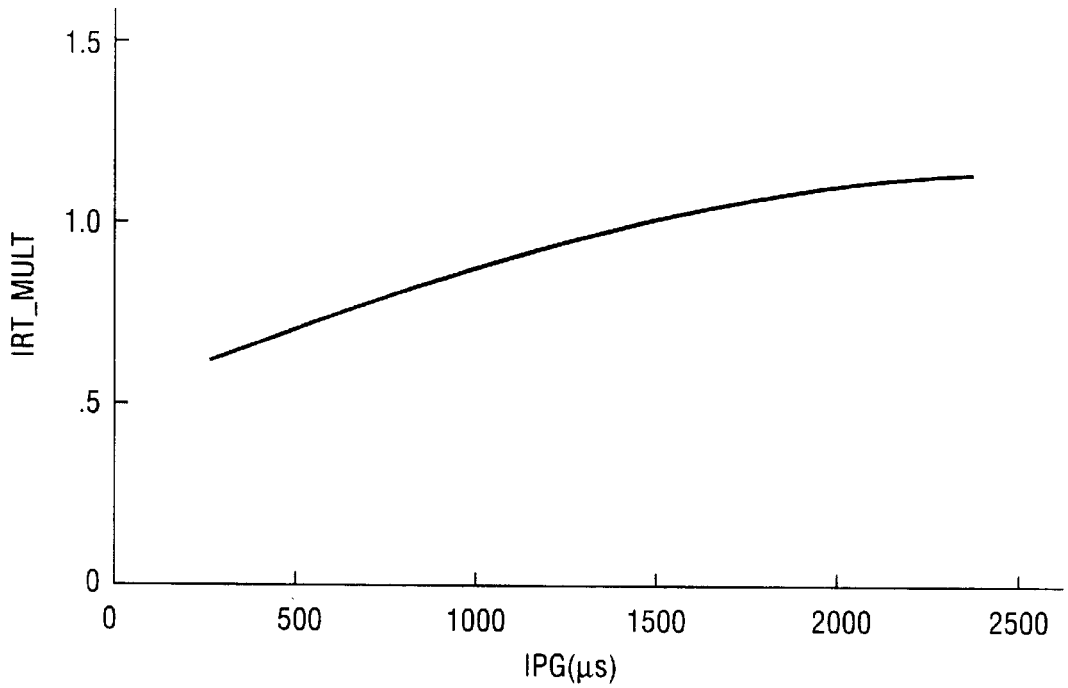
FIG. 7 is a graph depicting a split main injection rise-time adjustment factor versus inter-pulse gap which compensates for the effect of gradually diminishing solenoid magnetism on main rise-time.
Figure 8:
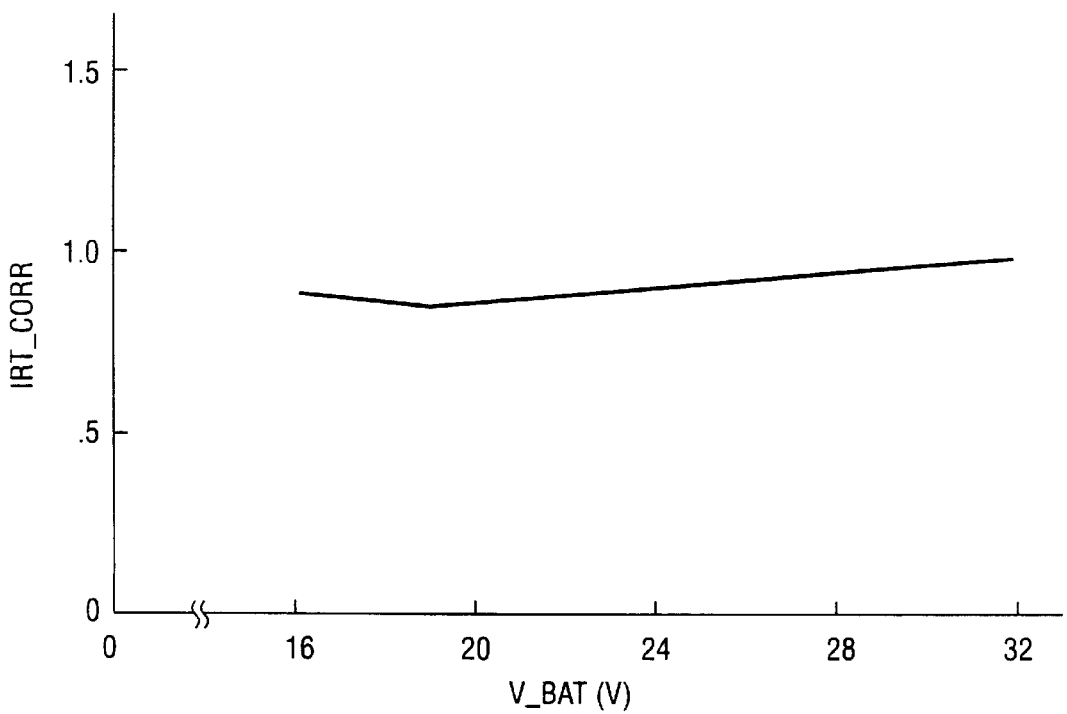
FIG. 8 is a graph depicting another main injection rise-time adjustment factor versus available battery voltage for injectors in which the opening of the control valve initiates injection.

At step 102, rise-time adjustment factors are determined for IRT_MAIN. As best shown in FIG. 7, IRT_MULT is found in a look-up table indexed by IPG. As best shown in FIG. 8, IRT_CORR is found in a look-up table indexed by V_BAT. In a preferred embodiment, at step 104, IRT_MAIN is determined according to the following equation:

$$IRT\_MAIN = IRT\_PILOT * IRT\_MULT * IRT\_CORR$$

wherein IRT_PILOT is the filtered pilot injection rise-time, and IRT_MULT and IRT_CORR are the main rise-time adjustment factors determined from look-up tables.

In one embodiment, IRT_MULT ranges from about 0.5 to about 1.16 in a look-up table populated by about 9 points, indexed by engine RPM ranging from 0 to about 2400 RPM.

With continuing reference to FIGS. 3 and 4, at step 106, main beginning of excitation time $BOE_{13}$ MAIN is determined as IRT_MAIN subtracted from the end of the inter-pulse gap IPG 66. It has been found that after the control valve reaches the closed position, the control valve retains some magnetism. This causes faster reaction of the control valve to the main injection excitation than to pilot injection excitation. The reaction time of the control valve, as affected by retained magnetism, decreases as the inter-pulse gap decreases. To make sure that the control valve reaches the fully unactuated position and has time for valve bounce to settle prior to main excitation, BOE_MAIN is subject to a minimum time according to the following equation:

$$BOE\_MAIN = \max(t_{CLOSED} + EPIGMN, t_{CLOSED} + IPG - IRT\_MAIN)$$

wherein max() is a function which returns the greater of the parenthetical values, $t_{CLOSED}$ is the time at which the control valve fell to its at rest or unactuated position, EPIGMN is a minimum gap time of preferably at least about 50 microseconds, IPG is the desired interpulse gap, and IRT_MAIN is the determined main injection rise-time. The first parenthetical value above represents a minimum excitation time for the control valve; the second parenthetical value represents a desired excitation time for the control valve.

At step 108, a main end of injection time EOI_MAIN is determined based on BOI_MAIN and desired main pulse width MPW 68. MPW 68 is based on a desired main fuel quantity based on engine conditions. At step 110, pilot end of excitation time EOE_PILOT is determined based on the required closing time of the control valve which is approximated as a constant.

With continuing reference to FIG. 3, in one embodiment of the present invention, split injection is enabled based on the value of V_BAT according to a hysteresis comparator. The cooperator has upper and lower threshold voltages $V_{TH}$ and $V_{TL}$ respectively, which for example are equal to 20 V and 19.2 V, respectively. The lower threshold is a voltage sufficient to allow split injection below which split injection becomes disabled either for reasons based on the control system hardware, or because the rise-time values are unreasonably large. The upper threshold is that above which disabled split injection is again permitted, which prevents rapid toggling in and out of split injection mode.

It is to be understood that there may be any number of other conditions that must be met in order to allow split injection. One example is that the Engine Governing Torque 58 is between predetermined minimum and maximum torque values. It is to be appreciated that the present invention allows split injection at a wide range of engine speeds and loads, and that individual conditions that may enable or disable split injection are for further enhancement of engine performance.

Figure 5:
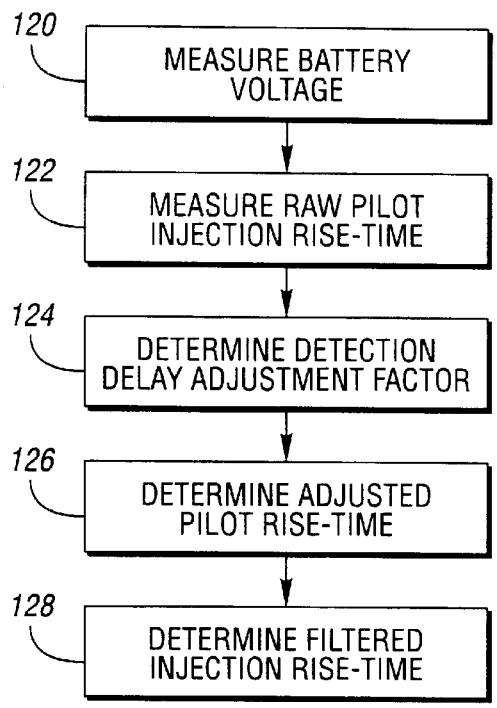
FIG. 5 is a block diagram illustrating a method of the present invention for determining filtered injector rise-time.
Figure 9:
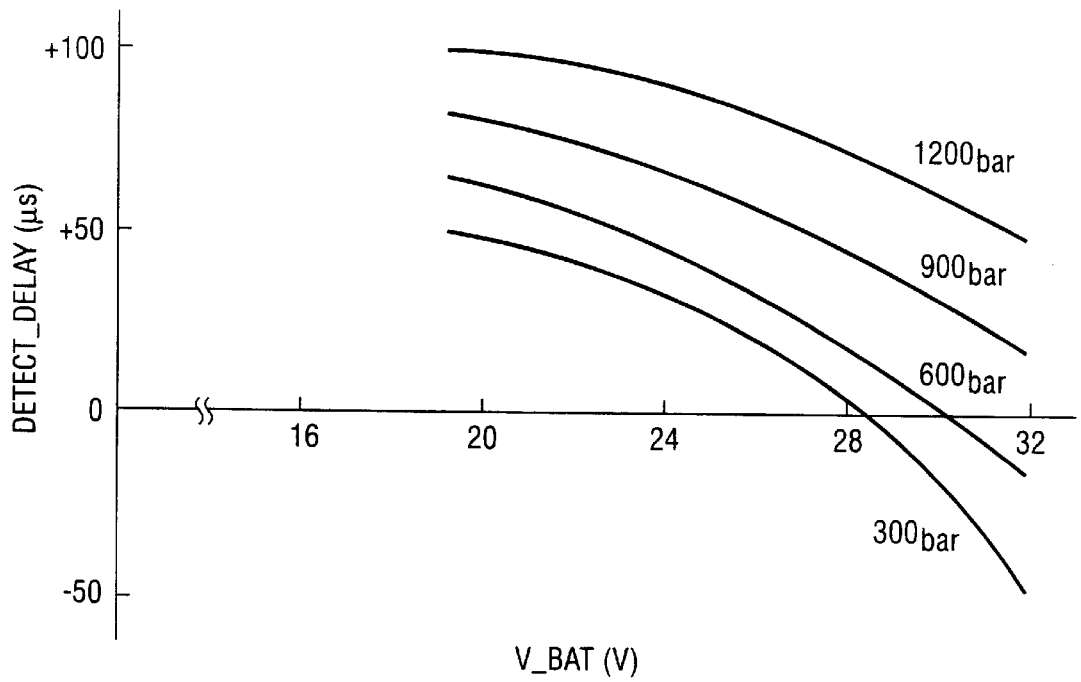
FIG. 9 is a graph depicting a valve actuation detection adjustment factor versus available battery voltage, and optionally injection pressure.

Referring now to FIGS. 3 and 5, a method of the present invention for determining filtered injection rise-time will be described. At step 120, available battery voltage V_BAT is measured. At step 122, raw pilot injection rise-time RAW_IRT_PILOT is measured by detecting the pilot injection opening of the control valve in response to pilot excitation at time IRT_DETECT. By detecting when the control valve is at the fully actuated position which is indicated by the current inflection or change in impedance (FIG. 3), control valve rise-time or actuation latency is measured. At step 124, as best shown in FIG. 9, a pilot valve opening detection delay adjustment factor DETECT_DELAY is determined. Pressure contour lines are shown to illustrate the varying of DETECT_DELAY with differing common rail injection pressures. In a fuel injection system that uses unit pumps rather than common rail 16, DETECT_DELAY may be based on V_BAT and/or fuel supply pressure and engine RPM. At step 126, an adjusted pilot rise-time IRT_PILOT is determined by subtracting DETECT_DELAY from RAW_IRT_PILOT. At step 128, filtered injection rise time is determined. The filter ideally rejects erroneous IRT_PILOT values and reduces shot-to-shot variation.

In one embodiment, DETECT_DELAY ranges from about −30 microseconds to about 65 microseconds and is indexed by pressures ranging from 0 to about 2200 Bar, and battery voltages from 0 to about 51 Volts. The look-up table as described immediately above is populated by about 150 points.

Figure 6:
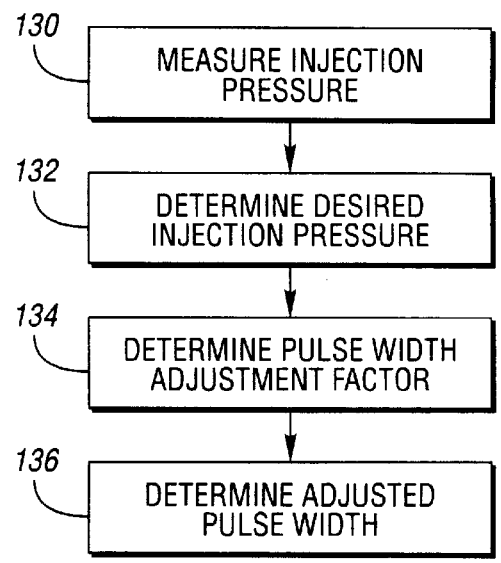
FIG. 6 is a block diagram illustrating a method of the present invention for pulse width duration adjustment to provide correct injected quantity while there exists deviation between intended and actual injection pressure.
Figure 10:
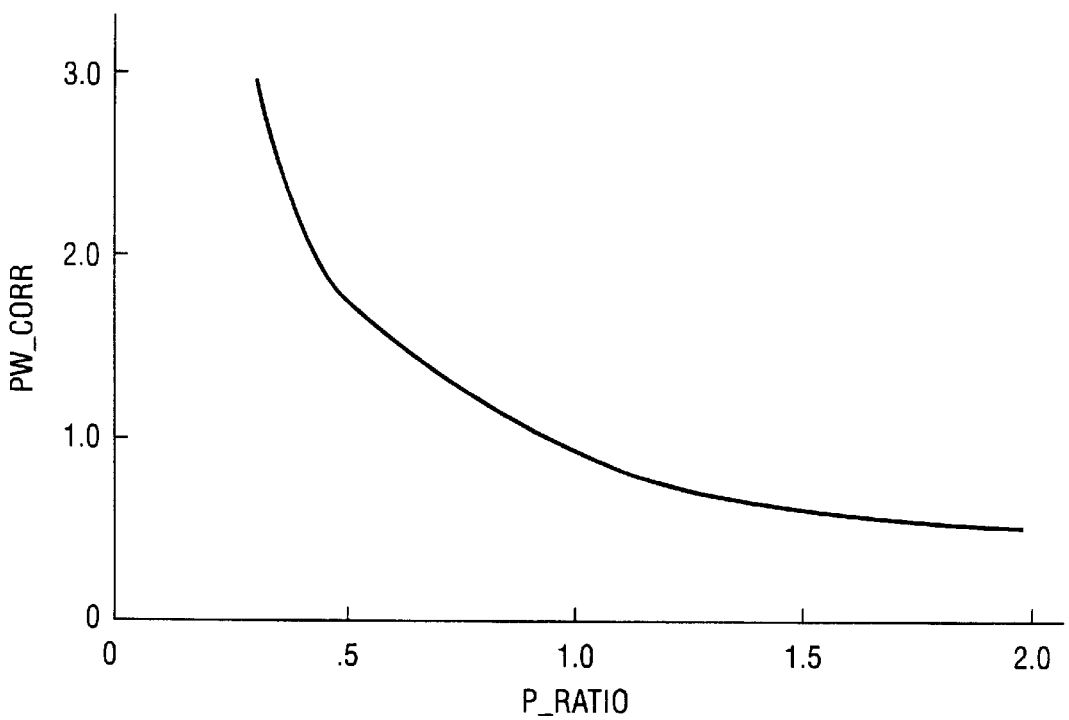
FIG. 10 is a graph depicting a pulse width adjustment factor versus an injection pressure ratio of observed pressure to desired pressure.

Referring to FIGS. 3 and 6, a method of the present invention for determining adjusted pulse width in a common rail embodiment of the present invention will now be described. At step 130, actual rail pressure for fuel injection is measured. At step 132, a desired rail pressure for fuel injection is determined based on engine RPM and desired engine torque. At step 134, as best shown in FIG. 10, an adjustment factor PW_CORR is determined from a look-up table indexed by P_RATIO. P_RATIO is the ratio of measured rail pressure to desired rail pressure. PPW 64 and MPW 68 are adjusted by multiplying the unadjusted or raw pulse width value by PW_CORR.

Figure 11:
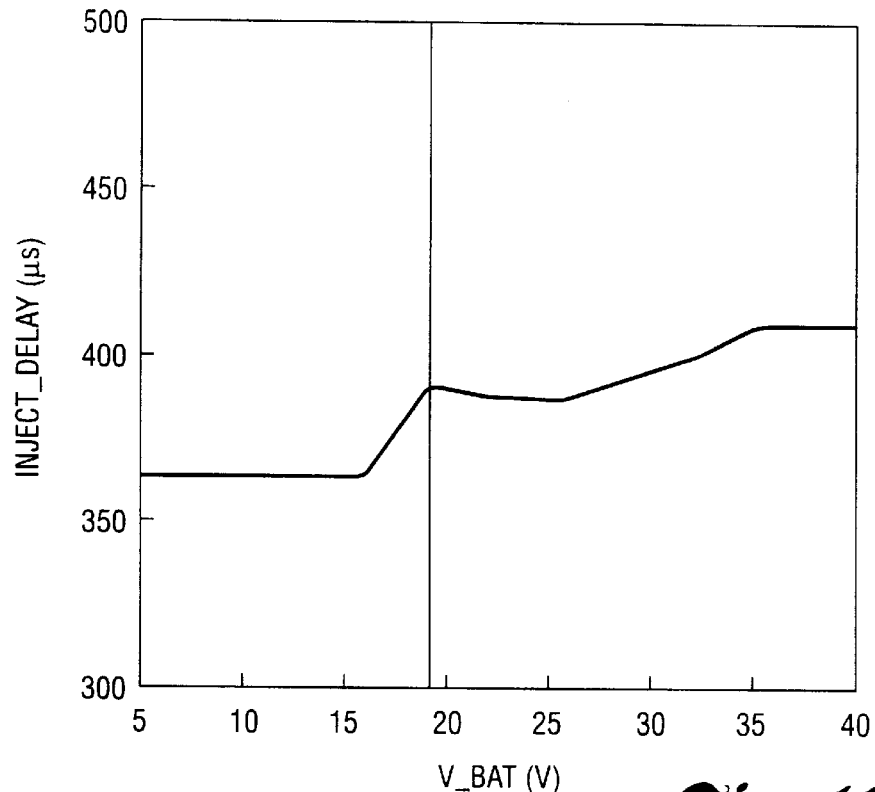
FIG. 11 is a graph depicting an injection delay factor versus available battery voltage which compensates for the influence of available battery voltage on control valve motion.

With reference to FIG. 3, additional aspects of the present invention will now be described. At decreased available battery voltages, the control valve takes longer to open as shown in dashed lines. Accordingly, the voltage is applied earlier at BOE_PILOT', causing earlier current ramp up resulting in earlier beginning of control valve motion. Although the voltage is applied at a time BOI_PILOT' such that the control valve will reach the full open position at the same time as when greater voltage is applied at BOI_PILOT, the earlier lifting of the control valve from its seat causes earlier needle lifting. As shown, the injection rate increases sooner after valve full open at decreased available battery voltages. To compensate for this, an injection delay INJECT_DELAY look-up table indexed by available battery voltage V_BAT is provided, as best shown in FIG. 11.

In one embodiment, INJECT_DELAY ranges from about 360 to about 410 microseconds and is indexed by battery voltages ranging from 0 to 51 volts. The look-up table is populated by about 17 points.

Based on the determined value of INJECT_DELAY which is the delay between the control valve reaching the full open position and the start of fuel injection BOI_PILOT, a compensated BOE_PILOT will cause BOI_PILOT to occur when desired, compensating for travel time of the control valve. For example, as shown in FIG. 3, BOE_PILOT" causes injection at the desired BOI_PILOT at the reduced available battery voltage shown in dashed lines.

Figure 12:
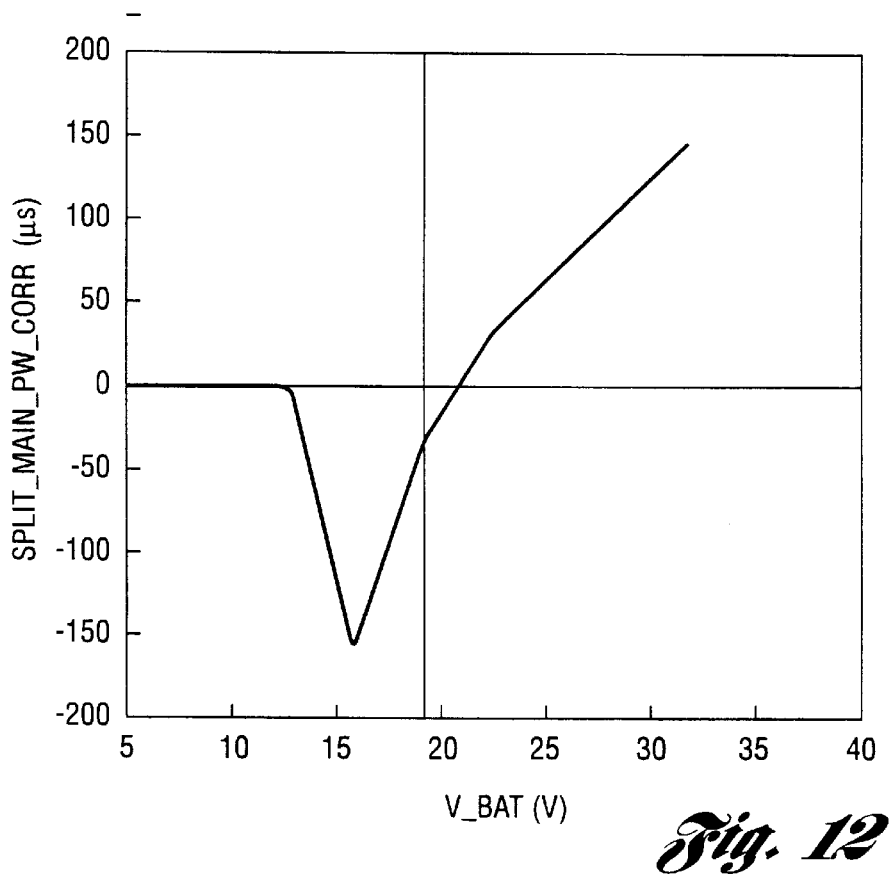
FIG. 12 is a graph depicting a split main pulse width adjustment factor versus available battery voltage which significantly reduces the influence of available battery voltage on split main pulse quantity injected.

An injection delay INJECT_DELAY also occurs at main injection as shown in FIG. 3. In a preferred embodiment, this injection delay is also compensated for at the main injection, and is additionally adjusted by adjusting the main pulse width MPW 68. An adjustment factor SPLIT_MAIN_PW_CORR is determined from a look-up table as best shown in FIG. 12, indexed by available battery voltage V_BAT. SPLIT_MAIN_PW_CORR is added to the raw main pulse width to produce an adjusted pulse width MPW 68. This adjustment is to compensate for the influence upon main pulse quantity of V_BAT, hence making possible a smooth transition between split and single injection without disturbing the engine torque governor, regardless of operating conditions.

In one embodiment, SPLIT_MAIN_PW_CORR ranges from about −160 to about 140 microseconds, and is located in a look-up table populated by about 9 points, indexed by battery voltages ranging from about 6 to about 32 Volts.

It is to be appreciated that the present invention eliminates the problems associated with main injection valve opening detection, indicated at A (FIG. 3), in which the current inflection may be difficult to accurately detect and the rise-times may vary due to magnetism of the control valve from the pilot pulse. By establishing main rise-time, and by determining main injection initiation control times based on the established main rise-time IRT_MAIN, enhanced split injection is possible and practical at a wide range of engine speeds and loads and within a range of battery voltage. Increased valve opening detection noise which would otherwise cause unacceptable imprecision which grows more intolerable at high engine speeds is avoided by methods of the present invention which eliminate the need to detect main injection valve opening, and preferably utilize a filtered injection rise-time based on the pilot injection measured rise-times.

While the best mode contemplated for carrying out the invention has been described in detail, those familiar with the art to which this invention relates will recognize various alternative designs and embodiments for practicing the invention as defined by the following claims.

What is claimed is:

1. A method of controlling fuel delivery in a fuel injector having an electronic control valve, the method comprising the steps of:
    establishing a pilot injection rise-time for the control valve;
    determining a pilot beginning of excitation time based on the pilot injection rise-time;
    determining an inter-pulse gap between a pilot injection termination and a main injection actuation based on engine conditions;
    establishing a main injection rise-time for the control valve; and
    determining a main injection beginning of excitation time based on the desired inter-pulse gap and the main injection rise-time to allow split injection over a wide range of engine speeds.

2. The method of claim 1 wherein the step of establishing a main injection rise-time comprises the steps of:
    measuring injection rise-time for the control valve;
    determining a filtered injection rise-time based on the measured injection rise-time; and
    establishing the main injection rise-time as the filtered injection rise-time.

3. The method of claim 2 wherein the step of measuring injection rise-time comprises the steps of:
    measuring fuel supply pressure;
    measuring a raw pilot injection rise-time by detecting the pilot injection actuation of the control valve in response to pilot injection excitation;
    determining a pilot actuation detection factor based on the fuel supply pressure; and
    determining injection rise-time based on the raw pilot injection rise-time and the pilot actuation detection factor.

4. The method of claim 1 wherein the main rise-time is based on the desired inter-pulse gap.

5. The method of claim 1 further comprising the step of:
    measuring available battery voltage, wherein the main rise-time is based on the available battery voltage.

6. The method of claim 1 wherein the inter-pulse gap is based on engine RPM.

7. The method of claim 1 further comprising the steps of:
    measuring available battery voltage;
    determining a minimum available battery voltage which is sufficient to allow split injection; and
    enabling main injection when the measured available battery voltage is greater than the minimum available battery voltage.

8. The method of claim 1 wherein the step of determining a main beginning of excitation time comprises:
    determining an earliest beginning of excitation time based on pilot injection termination time;
    determining a desired beginning of excitation time based on the inter-pulse gap and the main injection rise-time; and
    determining the main beginning of excitation time as the greater of the minimum beginning of excitation time and the desired beginning of excitation time.

9. The method of claim 1 further comprising the steps of:
    determining a pilot fuel quantity based on engine conditions;
    determining a pilot pulse width based on the pilot fuel quantity;
    determining a pilot end of excitation time based on the pilot pulse width;
    determining a main fuel quantity based on engine conditions;
    determining a main pulse width based on the main fuel quantity; and
    determining a main end of excitation time based on the main pulse width.

10. The method of claim 9 wherein the step of determining a main pulse width comprises the steps of:
    determining an observed fuel injection pressure;
    determining a desired fuel injection pressure based on engine conditions;
    determining a pulse adjustment factor based on the measured fuel injection pressure and the desired fuel injection pressure;
    determining a raw pulse width based on the main fuel quantity; and
    determining the main pulse width based on the raw pulse width and the pulse adjustment factor.

11. A method of determining fuel injection control valve rise-time in an electronic fuel injector, the method comprising the steps of:
    measuring fuel supply pressure;
    measuring a raw control valve rise-time by detecting control valve actuation in response to control valve excitation;
    determining an actuation detection factor based on the fuel supply pressure; and
    determining the control valve rise-time based on the raw control valve rise-time and the actuation detection factor.

12. The method of claim 11 further comprising the step of:
    measuring available battery voltage, wherein the actuation detection factor is further based on available battery voltage.

13. The method of claim 11 wherein fuel injection is performed as split injection including a pilot injection and a main injection, and wherein the raw control valve rise-time is a pilot injection rise-time.

14. A method of controlling fuel delivery in a fuel injector having an electronic control valve, the method comprising the steps of:
    establishing a pilot injection rise-time for the control valve;
    determining a pilot fuel quantity based on engine conditions;
    determining a pilot beginning of excitation time based on the pilot injection rise-time;
    determining a pilot end of excitation time based on the pilot beginning of excitation time and the pilot fuel quantity;

an inter-pulse gap between a pilot injection termination and a main injection actuation based on engine RPM so as to permit split injection;

establishing a main injection rise-time for the control valve;

determining a main fuel quantity based on engine conditions;

determining a main injection beginning of excitation time based on the desired inter-pulse gap and the main injection rise-time;

determining a main end of excitation time based on the main beginning of excitation time and the main fuel quantity; and determining a main end of excitation time based on the main beginning of excitation time and the main fuel quantity.

15. The method of claim 14 wherein the main injection rise-time is based on the pilot injection rise-time and the desired inter-pulse gap.

16. The method of claim 15 wherein the desired inter-pulse gap is subjected to a minimum time duration to allow split injection over a wide range of engine RPM.

17. The method of claim 16 wherein the desired inter-pulse gap approaches a near constant crankshaft angle as engine RPM decreases, and wherein the desired inter-pulse gap approaches the minimum time duration as engine RPM increases.

18. The method of claim 15 further comprising the step of:

measuring available battery voltage, wherein the main injection rise-time is further based on the available battery voltage.

* * * * *

UNITED STATES PATENT AND TRADEMARK OFFICE
CERTIFICATE OF CORRECTION

PATENT NO. : 5,924,403
DATED : July 20, 1999
INVENTOR(S) : Eric D. Thomas

It is certified that error appears in the above-identified patent and that said Letters Patent is hereby corrected as shown below:

<u>Column 11, claim 14,</u>
Line 1, before "an" insert -- determining --.

Signed and Sealed this

Fifth Day of February, 2002

Attest:

JAMES E. ROGAN
*Attesting Officer*  *Director of the United States Patent and Trademark Office*